(12) United States Patent
Marquardt et al.

(10) Patent No.: US 12,166,856 B2
(45) Date of Patent: *Dec. 10, 2024

(54) BLOCKCHAIN FOUNDRY BUILT INTO INTEGRATED CIRCUIT

(71) Applicant: T-Mobile Innovations LLC, Overland Park, KS (US)

(72) Inventors: Ronald R. Marquardt, Woodinville, WA (US); Lyle W. Paczkowski, Mission Hills, KS (US); Ivo Rook, New York, NY (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/460,370

(22) Filed: Sep. 1, 2023

(65) Prior Publication Data

US 2023/0412361 A1 Dec. 21, 2023

Related U.S. Application Data

(63) Continuation of application No. 17/481,145, filed on Sep. 21, 2021, now Pat. No. 11,791,983, which is a continuation of application No. 16/511,917, filed on Jul. 15, 2019, now Pat. No. 11,146,383.

(51) Int. Cl.
*H04L 9/06* (2006.01)
*H04L 9/32* (2006.01)

(52) U.S. Cl.
CPC .......... *H04L 9/0637* (2013.01); *H04L 9/0643* (2013.01); *H04L 9/3236* (2013.01)

(58) Field of Classification Search
CPC ..................................................... H04L 9/0637
See application file for complete search history.

(56) References Cited

U.S. PATENT DOCUMENTS

| | | |
|---|---|---|
| 9,282,898 B2 | 3/2016 | McRoberts et al. |
| 10,901,732 B1 | 1/2021 | Nelson et al. |
| 11,146,383 B1 | 10/2021 | Marquardt et al. |
| 11,791,983 B1 | 10/2023 | Marquardt et al. |
| 2018/0068091 A1 | 3/2018 | Gaidar et al. |
| 2021/0012586 A1 | 1/2021 | Dutta et al. |
| 2023/0110131 A1 | 4/2023 | Smith et al. |

OTHER PUBLICATIONS

Notice of Allowance and Fees dated Jun. 7, 2023 U.S. Appl. No. 16/511,917, filed Jul. 15, 2019.
Notice of Allowance and Fees dated Jun. 23, 2021 U.S. Appl. No. 17/481,145, filed Sep. 21, 2021.

*Primary Examiner* — Simon P Kanaan

(57) ABSTRACT

A method of establishing a blockchain. The method comprises receiving an activation message that comprises micro code, building an activation block of a blockchain by a block foundry implemented in a processor of an integrated circuit (IC), wherein the activation block comprises a hash of a genesis block of the block chain that is stored in a non-volatile portion of a memory of the IC and a data portion that comprises the micro code, providing a copy of the activation block of the blockchain by the block foundry to a blockchain application executing in the processor of the IC, storing the copy of the activation block by the blockchain application in the non-volatile portion of the memory of the IC, and transmitting a copy of the genesis block and a copy of the activation block by the blockchain application to a wireless communication service provider.

20 Claims, 9 Drawing Sheets

BLOCKCHAIN FOUNDRY BUILT INTO INTEGRATED CIRCUIT

CROSS-REFERENCE TO RELATED APPLICATIONS

This application is a continuation of and claims priority under 35 U.S.C. § 120 to U.S. patent application Ser. No. 17/481,145 filed on Sep. 21, 2021, entitled "Blockchain Foundry Built Into Integrated Circuit" by Ronald R. Marquardt, et al., which is a continuation of and claims priority under 35 U.S.C. § 120 to U.S. patent application Ser. No. 16/511,917, filed on Jul. 15, 2019, entitled "Blockchain Foundry Built into Integrated Circuit," by Ronald R. Marquardt, et al., now U.S. Pat. No. 11,146,383 issued Oct. 12, 2021, all of which are incorporated herein by reference in their entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The Internet of Things (IoT) generally refers to the extension of Internet connectivity beyond conventional computer-like devices to a wide variety of physical devices not customarily associated with computers. For example, it is conventional that server computers, desktop computers, laptop computers, tablet computers, notebook computers, and smart phones may be connected to the Internet and may download content, upload content, and execute distributed applications via these Internet connections. It is unconventional that a refrigerator, an exhaust fan over a stovetop, or a coffee pot may be connected to the Internet. The continuing reduction in feature sizes of semiconductors and the continuing cost reductions of semiconductors have enabled embedding both sophisticated semiconductor logic and radio transceivers in systems on a chip (SoC) in many everyday items or inexpensive items. The proliferation of Internet enabled devices—IoT devices—is driving a great deal of technical innovation.

SUMMARY

In an embodiment, an integrated circuit (IC) is disclosed. The IC comprises a non-transitory memory, a processor, a blockchain foundry built in the processor, wherein the blockchain foundry is configured to generate blocks of a blockchain comprising a nonce that satisfies a numerical condition, a hash of a previous block of the blockchain, a data portion of the block, and a hash determined based on the nonce, the hash of the previous block, and the data portion of the block. The IC further comprises a blockchain application build in the processor and a genesis block stored in the non-transitory memory, wherein the data portion of the genesis block comprises an identity of a manufacturer of the IC, an identity of a location where the IC was manufactured, a date the IC was manufactured, and an identity of the IC and wherein the genesis block is the first block of the blockchain. The blockchain application when the processor executes, sends a one-time request to the blockchain foundry to build an activation block of the blockchain that is subsequent to the genesis block of the blockchain, wherein the request to build the activation block comprises micro code that is input to the IC during a process of activating the IC for use in an appliance in which the IC is embedded, in response to the one-time request, receives a copy of the genesis block from the blockchain foundry, and stores the copy of the genesis block in the non-transitory memory. The blockchain application further, in response to the one-time request, receives the activation block from the blockchain foundry, wherein the activation block comprises a data portion that comprises the micro code, stores the activation block in the non-transitory memory, and executes the micro code. The blockchain application further, based on executing the micro code, sends a request to the blockchain foundry to build a first event block of the blockchain, wherein the request to build the first event block comprises information associated with a first event of the IC and comprises a hash of the activation block, receives the first event block from the blockchain foundry, and stores the first event block in the non-transitory memory. The blockchain application further, in response to receiving the first event block, transmits a copy of the genesis block, a copy of the activation block, and a copy of the first event block to a server computer, after transmitting the copies of the genesis block, the activation block, and the first event block, sends a request to the blockchain foundry to build a second event block of the blockchain wherein the request to build the second event block comprises a hash of the first event block, receives the second event block from the blockchain foundry, stores the second event block in the non-transitory memory, and transmits a copy of the second event block to the server computer.

In another embodiment, a method of establishing a blockchain associated with an Internet of things (IoT) device by a block foundry implemented in a trusted security zone of an integrated circuit of the IoT device is disclosed. The method comprises receiving an activation message via a radio transceiver of an IoT device from a wireless communication service provider, wherein the activation message comprises wireless communication service authentication codes and micro code and, in response to the IoT device receiving activation information, building an activation block of a blockchain by a block foundry implemented in a trusted security zone (TSZ) of an integrated circuit (IC) of the IoT device, wherein the activation block comprises a hash of a genesis block of the block chain stored in a non-trusted portion of memory of the IC and a data portion that comprises the micro code. The method further comprises providing the activation block of the blockchain by the block foundry to a blockchain application executing in a rich execution environment (REE) of the IC, storing the activation block by the blockchain application in the non-trusted portion of the memory of the IC, and transmitting a copy of the genesis block and a copy of the activation block by the blockchain application via the radio transceiver to the wireless communication service provider, whereby the blockchain is established by the block foundry implemented in the TSZ of the IC.

In yet another embodiment, a method of establishing and extending a blockchain associated with an Internet of things (IoT) device by a block foundry implemented in a trusted security zone of an integrated circuit of the IoT device is disclosed. The method comprises receiving an activation message via a radio transceiver of an IoT device from a wireless communication service provider, wherein the activation message comprises micro code and, in response to the IoT device receiving activation information, building an activation block of a blockchain by a block foundry implemented in a processor of an integrated circuit (IC) of the IoT device, wherein the activation block comprises a data portion that comprises the micro code and a hash of the activation block. The method further comprises providing a copy of the activation block of the blockchain by the block foundry to a blockchain application executing in the processor of the IC, storing the copy of the activation block by the blockchain application in a non-volatile portion of a memory of the IC, wherein a genesis block of the blockchain is stored in the non-volatile portion of the memory, and executing the micro code by the blockchain application. The method further comprises, in response to executing the micro code, sending a request for a first event block by the blockchain application to the block foundry, wherein the request comprises a hash of the activation block and event information, building a first event block by the block foundry based on the event information and the hash of the activation block, sending the first event block by the block foundry to the blockchain application, storing the first event block by the blockchain application in the non-volatile portion of memory of the IC, and transmitting a copy of the genesis block, a copy of the activation block, and a copy of the event block by the blockchain application via the radio transceiver to the wireless communication service provider.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
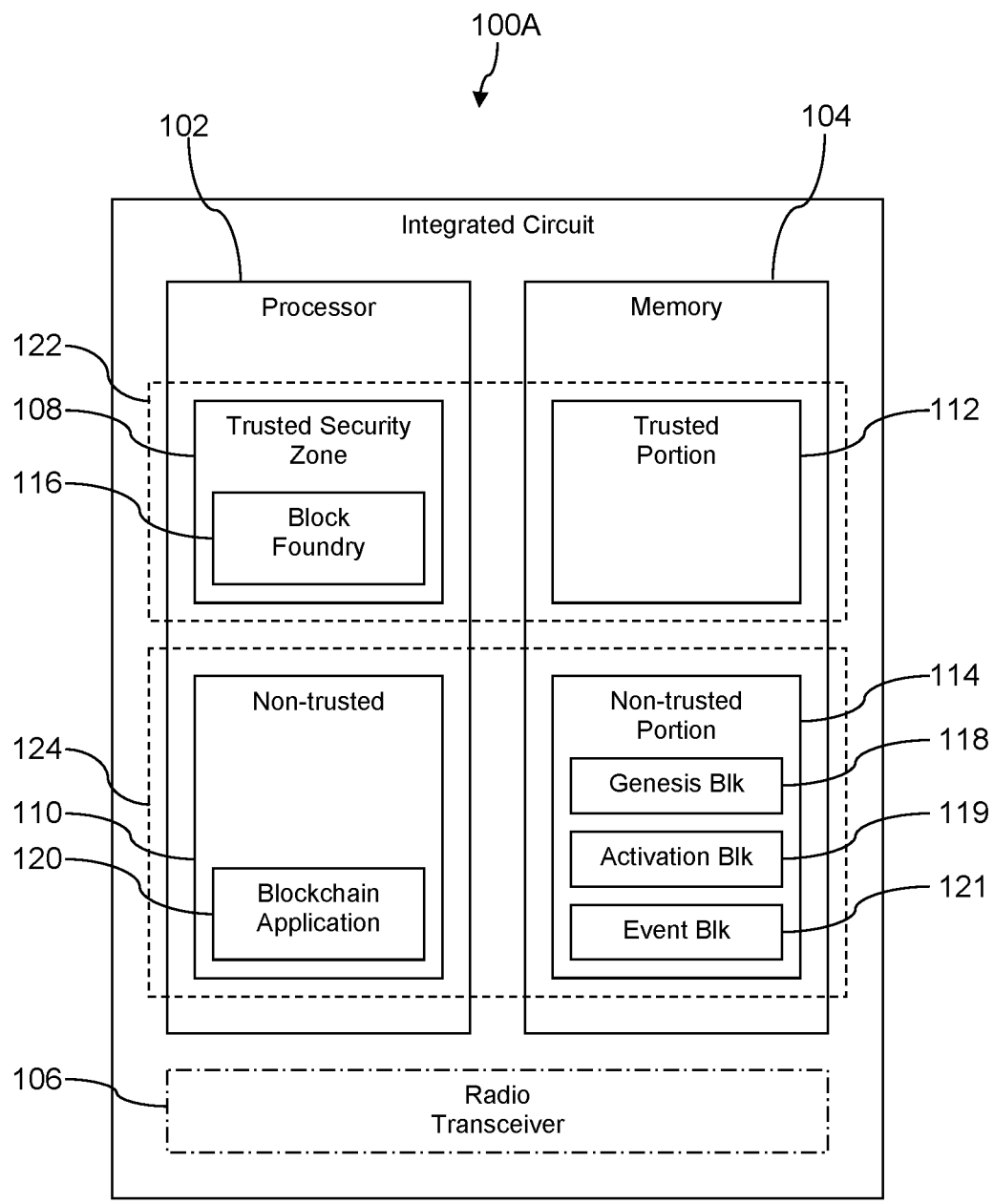
FIG. 1A is a block diagram of an integrated circuit according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a new integrated circuit (IC) that embeds processor instructions that implement a blockchain block foundry and a blockchain application in the semiconductor features of the IC. In an embodiment, the block foundry is implemented in a trusted security zone portion of a processor of the IC, and the blockchain application is implemented in a non-trusted portion of the processor of the IC. In another embodiment, however, both the blockchain foundry and the blockchain application are implemented in the non-trusted portion of the processor of the IC. The instructions that establish the block foundry and the blockchain application may be embedded in the IC itself, for example embodied in circuit features of the IC. The trusted security zone may be implemented as a trust zone, a secure enclave, a cryptocell, an SGX, a crypto element, a hardware root of trust (HRoT), or other hardware supported trust element. A genesis block that acts as the first block of a blockchain is created at time of manufacture of the IC and is stored in a non-trusted portion of a memory of the IC. The data values in the genesis block may comprise a date of manufacture, a location of manufacture, a name of the manufacturer, a name of the IC (e.g., a chip name or identity).

The IC may be embedded in an Internet of things (IoT) device. The IC can autonomously found a block chain and extend the blockchain and send the blocks off of the IoT device to a central storage facility where the complete blockchain can be stored. The IC may store only a few blocks of the blockchain. When the IoT device in which the IC is embedded is activated for communication, the communication network may provide activation data to the IoT device in the form of micro code. The blockchain application requests the block foundry to create an activation block that stores the micro code and other information about the communication service activation. The block foundry creates the requested activation block and provides it to the blockchain application. The activation block may be stored in the non-trusted portion of memory in the IC. The activation block may comprise the hash of the genesis block, a nonce, the data content including micro code and possibly additional data, and a hash over the other contents of the activation block.

The blockchain application may execute the micro code. Some of the micro code may configure the blockchain application with executable instructions and/or configuration settings. The micro code may configure the blockchain application to request event blocks for specific processing events. When such events occur, the blockchain application sends information about the event to the block foundry and requests the block foundry to create an event block storing the event information. The micro code may additionally provide instructions or information pertaining to wireless communication settings to use when the IC or the IoT device the IC is embedded in communicates with a wireless network. For example, the micro code may comprise instructions that evaluate network conditions and establish communication sessions and/or request quality of service (QoS) levels based on this evaluation of network conditions. For example, when the micro code evaluates that the wireless communication network is congested, it causes the IC or the IoT device to request a first QoS associated with a low throughput or higher latency for communications, but when the micro code evaluates that the wireless communication network is not congested, it causes the IC or the IoT device to request a second QoS associated with a higher throughput or a lower latency for communications. The configuration settings provided by the micro code may configure the IC with radio access network (RAN) credentials for gaining access to the RAN. Alternatively, the activation message may comprise data that specifies the RAN credentials and possibly confidential tokens or keys. The configuration settings may identify wireless radio frequency bands that the IC and/or the IoT device the IC is embedded in should use for engaging in wireless communication.

When the first event block is returned to the blockchain application, a blockchain may be said to exist associated with the IoT device: the genesis block, the activation block, and the first event block. The blockchain application stores the first event block in the non-trusted portion of memory. The blockchain application sends copies of the genesis block, the activation block, and the first event block to a server in the communication network domain.

As additional events occur on the IoT device, the blockchain application requests additional event blocks be created by the block foundry. When a new event block is returned to the blockchain application, in an embodiment, the blockchain application deletes the currently stored event block, replaces it with the newly created event block, and sends the new event block to the server in the communication network domain. In this way, the blockchain application stores only the latest event block, the genesis block, and the activation block. The server in the communication network domain, by contrast, can store the entire blockchain in a database along with complete blockchains associated with other IoT devices. This may conserve limited storage resources in the IC and/or IoT device. Alternatively, for some ICs that have more extensive memory resources, the blockchain application adds the new event block to the non-trusted memory but does not delete the previous event block.

In an embodiment, the blockchain application can generate billing events (i.e., calculate a bill for communication services the IC has used) and possibly payment transaction events that it sends to the communication network, whereby the communication service subscription account of the IoT device is periodically paid. Because the server in the communication network domain has a copy of the blockchain also, the server can spot check IoT devices to see if they are faithfully determining billing for their communication service usage. Alternatively, instead of the IC determining its bill, a billing application in the service provider network may traverse the complete blockchain associated with the IoT device that is stored in the network—or the portion of the blockchain extended since a most recent previous billing cycle—and generate a bill for communication services consumed by the IoT device.

The billing of communication services for IoT devices poses challenges to conventional billing platforms. Such billing platforms may be operated by third party organizations that are slow to adapt to new devices and/or new interfaces. Additionally, the costs of using such third party billing platforms is too high for the modest cost of the IoT devices in many cases. Because support for tracking IoT device events using blocks created by the block foundry is built into the processor of the IC, wireless communication service providers can push some of the billing responsibility onto the IoT device itself. The wireless communication service providers, given this technology infrastructure, can trust that the IoT devices will report billing events faithfully, and this trust allows the service providers to deploy a less costly, less burdensome billing mechanism that relies on the IoT device itself engaging actively in the billing process. This reduces the processing burden on service provider computers without over burdening the IC and/or IoT device the IC is embedded in. It is assumed that the IC has spare processing capacity (e.g., the IC is not fully utilized continuously). This can be seen to provide efficiency improvements in the core network. This can be viewed as a kind of edge computing.

In an example, the IC receives microcode during activation. At least some of the microcode is related to billing processes. The microcode may define events to be captured and stored in event blocks that are related to bill processing. For example, an event that relates to establishing a radio frequency band for wireless communication and a QoS may be captured and stored in an event block. Billing for communication on that radio frequency band and for the QoS may later be calculated based on this created and promulgated event block. The event block may be stored on the IC and also forwarded back to the wireless communication service provider. The microcode may further define actual generation of a bill or a toll that will later aggregate to the bill. The microcode may respond to the generation to a new event block by calculating a fee to aggregate to an accumulating bill amount, add the fee to the accumulating bill, and transmit the new event block. When a new event block is created, the microcode may delete the previous event block, process the new event block (e.g., determine an associated fee and aggregate to the bill), and sent the new event block to the service provider.

The microcode may cause the IC to periodically transmit the accumulated bill to the service provider, for example hourly, daily, weekly, or some other periodic interval. The microcode may cause the IC to reset the accumulated bill to zero after transmitting the accumulated bill to the service provider and after receiving confirmation from the service provider that the transmission of the accumulated bill succeeded.

Alternatively, the microcode may process event blocks in a different way to preprocess the event information relevant to calculating service billing for the IoT device and send preprocessed information to the wireless communication service provider. A billing server of the service provider may then complete calculation of a service bill for the IoT device based on the preprocessed information received from the IoT device. The processing by the billing server may be made easier by the preprocessing performed by the IoT device. In an embodiment, the billing server may check the bills provided by IoT devices by independently calculating bills based on the event blocks forwarded to the service provider by the IoT devices. For example, the billing server may check 1% of bills of all IoT devices in each billing cycle, and rotate across different IoT devices in different billing cycles.

In an embodiment, the block foundry and the microcode may cause the IC and/or IoT device to record and track other information of interest, for example, sensor data. The sensor data may relate to flow rates of hydrocarbons in a pipeline. The sensor data may relate to operating parameters of engines and other systems in an aircraft or automobile. The sensor data may relate to operating parameters of medical equipment, such as automated drug dispensing and administration to an individual patient. Because some of this kind of data may be confidential and sensitive in nature, the ability to generate event blocks recording sensor data in the IC and on the IoT device itself may contribute to maintaining the information confidential. In an embodiment, the IC and/or IoT device may accumulate event blocks capturing sensor data and periodically encrypt the event blocks and transmit them to a server computer, such as a data collection server computer or a healthcare delivery server computer.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. For more details on establishing trusted end-to-end communication links relying on hardware assisted security, see U.S. Pat. No. 9,282,898, issued Mar. 15, 2016, entitled "End-to-end Trusted Communications Infrastructure," by Leo Michael McRoberts, et al., which is hereby incorporated by reference in its entirety. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

Turning now to FIG. 1A, an integrated circuit (IC) 100A is described. The IC 100A comprises a processor 102 and memory 104. In an embodiment, the IC 100A further comprises at least one radio transceiver 106, but in other embodiments the IC 100A does not comprise any radio transceiver. In an embodiment, the IC 100A is a system on a chip (SoC). In some contexts, the IC 100A may be referred to as a ledger server on a SoC. In an embodiment, the IC 100A is an application specific integrated circuit (ASIC). The IC 100A may be fabricated as a semiconductor chip using semiconductor manufacturing processes involving a sequence of deposits of thin layers of material, exposing the layers through photomasks that define electric circuit features of the layer, etching the exposed layer, and depositing yet more layers on top.

The processor 102 comprises a trusted security zone 108 and a non-trusted portion 110. The memory 104 comprises a trusted portion of memory 112 and a non-trusted portion of memory 114. The trusted security zone 108 comprises a block foundry 116. The non-trusted portion 110 comprises a blockchain application 120. In some contexts, the trusted security zone 108 of the processor 102 and the trusted portion of memory 112 may be said to provide a trusted execution environment (TEE) 122. In some contexts, the non-trusted portion of the processor 112 and the non-trusted portion of memory 114 may be said to provide a rich execution environment (REE) 124. The block foundry 116 and the blockchain application 120 comprise executable instructions and configuration data that are physically built into the IC 100A, for example in the form of hardware logic. The blockchain application 120 and the block foundry 116 may be said to be built into the IC 100a, implemented in the IC 100a, or embedded in the IC 100a.

The non-trusted portion of the processor 110 is designed and fabricated in such a way that it is unable to access the trusted portion of memory 112 at any time or under any circumstances. The processor 102 is designed and fabricated in such a way that when the trusted security zone 108 is executing, the non-trusted portion of the processor 110 is unable to access the non-trusted portion of memory 114, to access the radio transceiver 106, to access communication busses (not shown) inside the IC 100A, or to access interfaces of the IC 100A. In an embodiment, the trusted security zone 108 and the non-trusted portion of the processor 102 are located on different processing cores of the processor 102. The trusted security zone 108 is able to access the non-trusted portion of memory 114.

A genesis block 118 that comprises data that defines a first block on a blockchain associated with the IC 100A may be stored in the non-trusted portion of memory 114. The genesis block may be a first block on a blockchain associated with an Internet of things (IoT) device in which the IC 100A is located. The genesis block 118 may comprise a data portion, a nonce that satisfies a constraint, and a hash over the data portion and the nonce. The nonce may be a number such that when the hash is calculated the hash satisfies some format or numeric constraint, for example that the hash comprises two leading zero digits or four leading zero digits (e.g., the hash value '00007683998001276338' has four leading zero digits). The data portion of the genesis block 118 may comprise information about the IC 100A, for example an identity of a manufacturer of the IC, an identity of a location where the IC was manufactured, a date the IC was manufactured, and an identity of the IC. The data portion of the genesis block 118 may comprise additional information. The genesis block 118 may be stored in the non-trusted portion of memory 114 at the time of manufacture of the IC 100A.

The block foundry 116 is configured to generate blocks of a blockchain while executing in the trusted security zone 108, thereby securing the process of generating blocks from malware that might be infiltrated onto the IC in the non-trusted portion of memory 114 and/or the non-trusted portion of the processor 110. When a request for a block is received by the block foundry 116, it builds a block that comprises the hash value provided in the request as the hash of the previous block in the blockchain, the data provided in the request as the data portion of the block, a nonce that satisfies a special condition, and a hash over the nonce, the previous hash, and the data. The block foundry 116 then returns the created block to the requestor, for example to the blockchain application 120.

When the IC 100A is powered on, the blockchain application 120 checks the non-trusted portion of memory 114 to see if a blockchain has been activated. If no blockchain has been activated, the blockchain application 120 waits to receive an activation message, for example from the radio transceiver 106 or from a communication interface of the IC 100A. The activation message comprises micro code and optionally additional data. The activation message may comprise communication keys for accessing and communicating on a communication network, for example an identity of the network, an authorization token or authentication key, and other confidential information.

In response to receiving the activation message, the blockchain application 120 sends a block creation request to the block foundry 116 comprising the micro code and other information received in the activation message. The blockchain application 120 may further send the hash of the genesis block 118. This request indicates that the requested block is to be an activation block. The block foundry 116 creates the requested activation block that contains the hash of the genesis block 118, a data portion comprising the micro code and optionally additional data, a nonce, and a hash over the previous hash over the nonce, the previous hash, and the data portion. The block foundry returns the activation block 119 to the blockchain application 120. The blockchain application 120 stores the activation block 119 in the non-trusted portion of memory 114.

The blockchain application 120 executes the micro code that is now stored in the activation block. The micro code comprises instructions to be executed to build and maintain a blockchain that embodies a record of the activities of the IC 100A and/or a record of the activities of an IoT device in which the IC 100A is embedded. The micro code may identify events that the IC 100A may experience that are to trigger the blockchain application 120 to request creation by the block foundry 116 of event blocks of the blockchain. The blockchain application 120, based on having executed the micro code, may send event block creation requests along with a hash value of a previous block in the blockchain and associated event information to the block foundry 116. The block foundry 116 may create an event block 121 based on the received hash value of the previous block and based on the event information and return the event block 121 to the blockchain application 120.

The blockchain application 120 may delete the previous event block 121 from the non-trusted portion of memory 114 and store the newly created event block 121 in the non-trusted portion of memory 114. Thus, the non-trusted portion of memory 114 only stores the last event block 121 and deletes other event blocks 121 (it is noted that the non-trusted portion of memory 114 may store other non-event block data such as the copy of the genesis block, the activation block, data collected by an IoT device in which the IC 100A is embedded, processing results, etc.). Alternatively, in an IC 100A having ample memory 104, the blockchain application 120 may not delete the previous event block 121 but simply store the new event block 121.

Figure 1B:
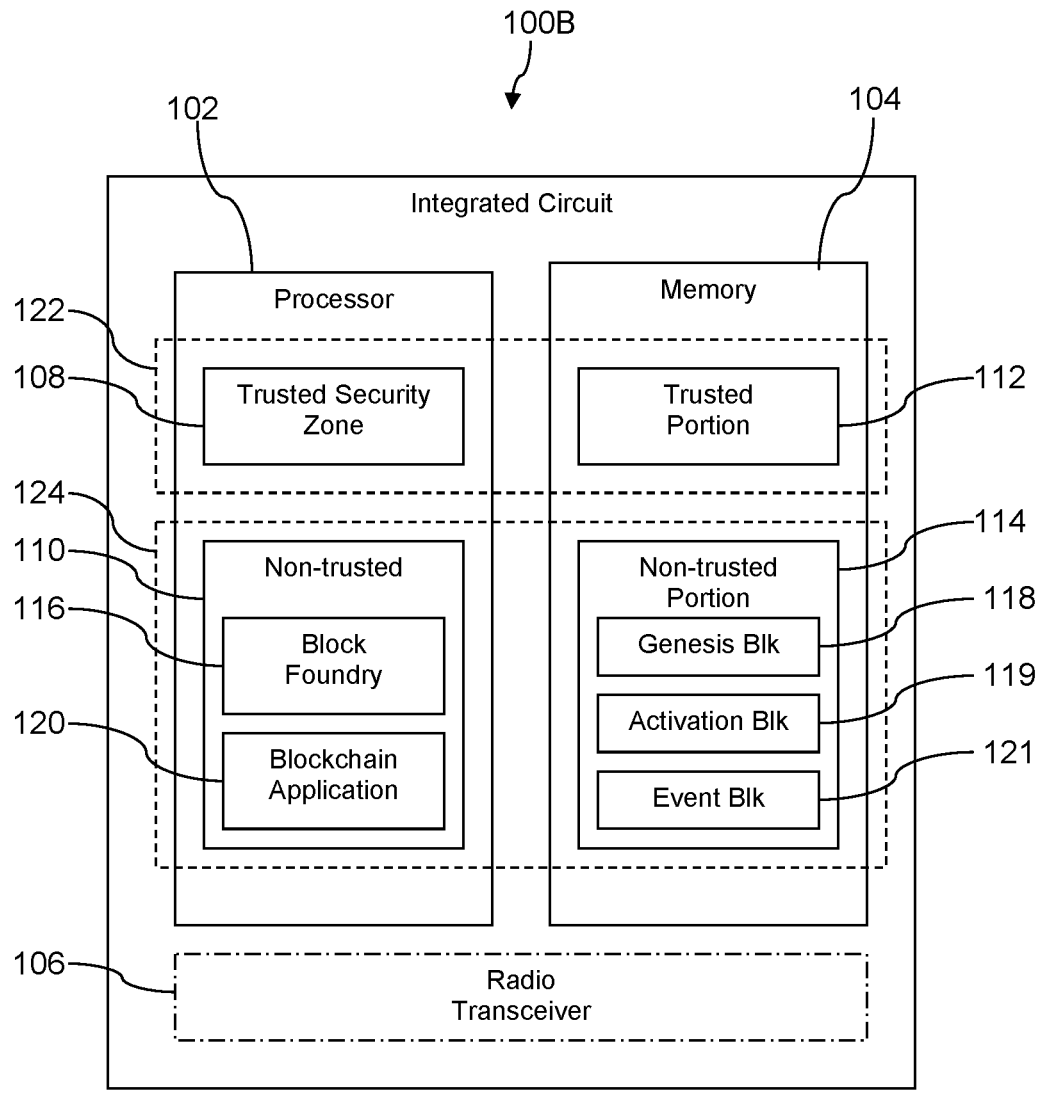
FIG. 1B is a block diagram of another integrated circuit according to an embodiment of the disclosure.
Figure 1C:
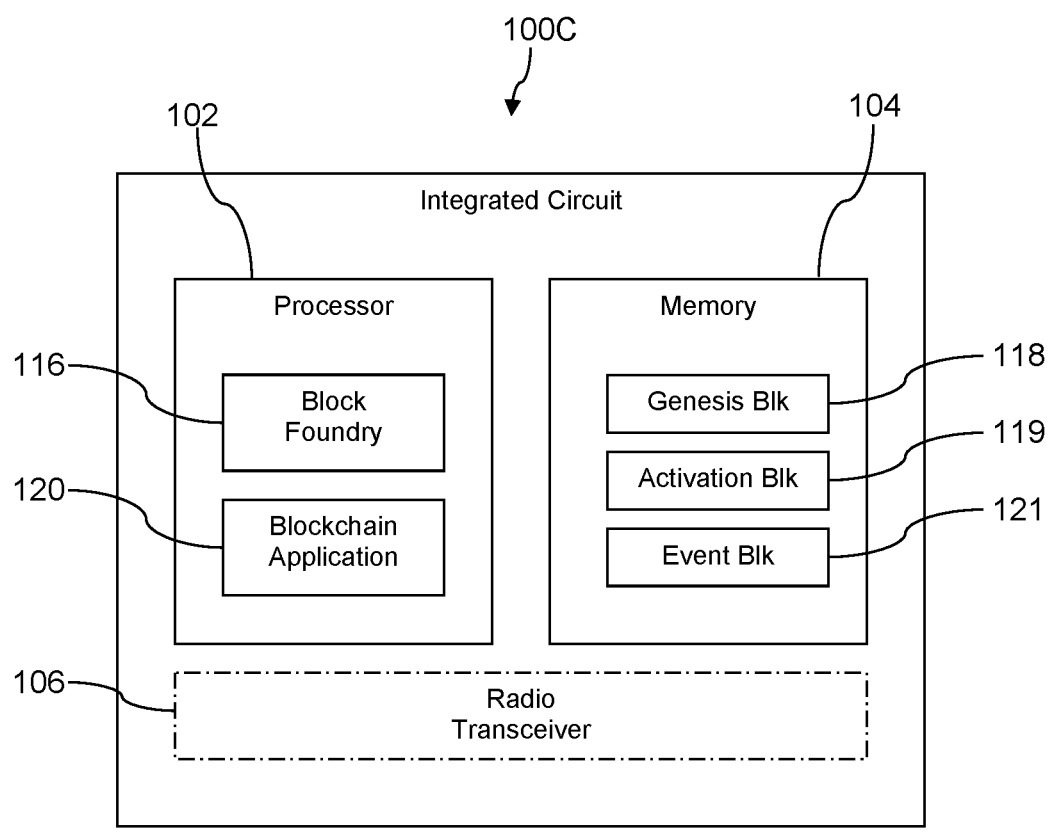
FIG. 1C is a block diagram of yet another integrated circuit according to an embodiment of the disclosure.

Turning now to FIG. 1B, an alternative embodiment of the IC 100 is described. The IC 100B is substantially similar to the IC 100A described above with reference to FIG. 1A, with the difference that the block foundry 116 is embodied in the non-trusted portion of the processor 124 rather than in the trusted security zone 108. Turning now to FIG. 1C, an alternative embodiment of the IC 100 is described. The IC 100C is substantially similar to the IC 100A described above, with the difference that the block foundry 116 is embodied in a processor 102 that has no trusted security zone. The IC 100C further does not have a trusted portion of memory 112 and does not support a TEE 122.

Figure 2:
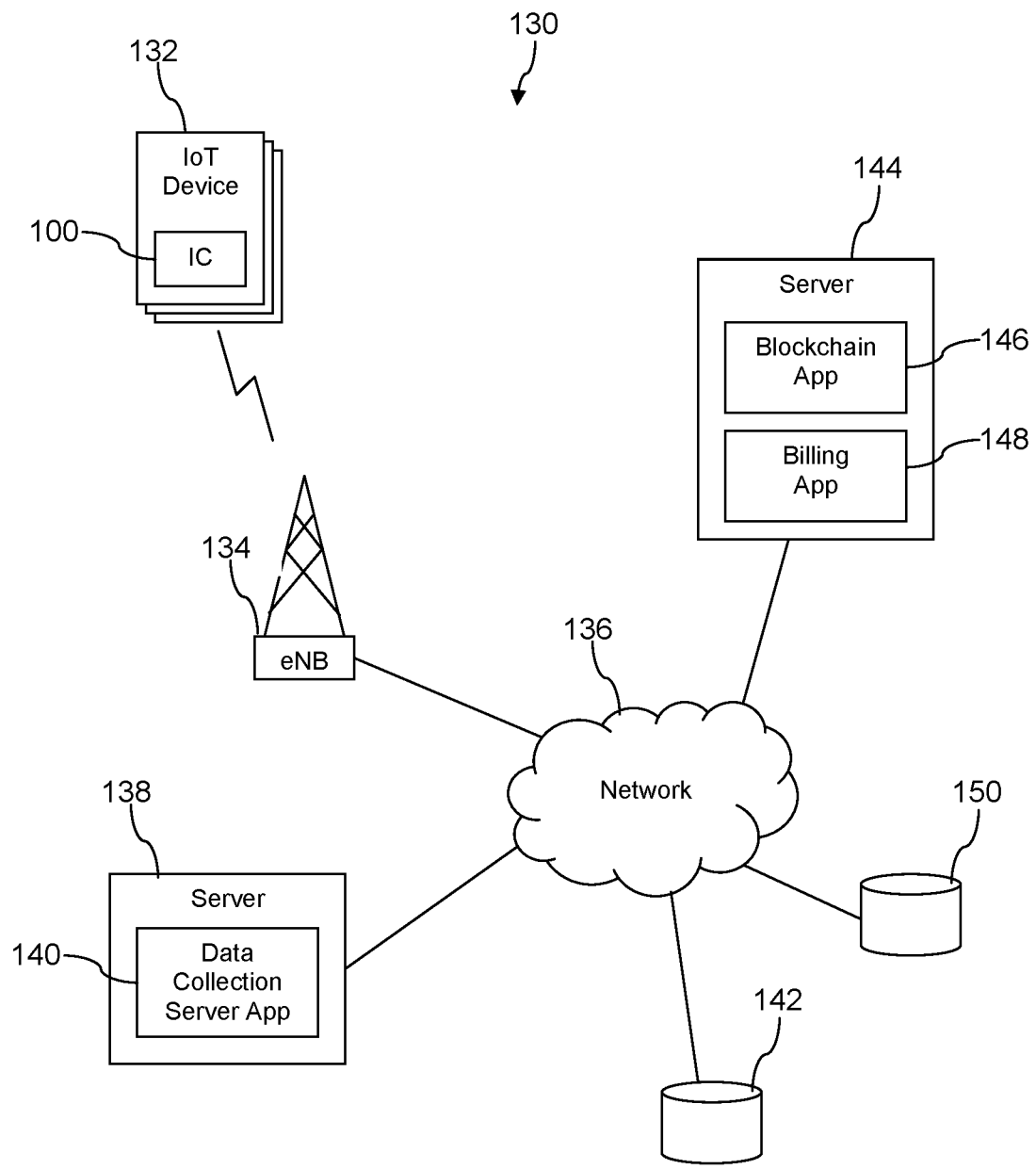
FIG. 2 is a block diagram of a communication system according to an embodiment of the disclosure.

Turning now to FIG. 2, a communication system 130 is described. In an embodiment, the system 130 comprises a plurality of Internet of things (IoT) devices 132 each embedding an IC 100 (as described above with reference to FIG. 1A, FIG. 1B, and FIG. 1C), a cell site 134, a network 136, a server computer 138, a data collection server application 140, and an IoT data collection data store 142. The IoT devices 132 may be embedded in larger assemblies or systems such as an automobile, a pickup truck, a refrigerator, a clothes washing machine, a clothes dryer, a toaster, an entertainment system, an HVAC system, an electric utility meter, a gas utility meter, a gas pipeline valve, and other assemblies. The IoT devices 132 are able to connect to and communicate to the Internet via the cell site 134 and the network 136. The IoT devices 132 may collect data from the systems or appliances in which they are embedded and transmit the data to the data collection server application 140 executing on the server computer 138. The network 136 comprises one or more public networks, one or more private networks, or a combination thereof. A part of the network 136 may comprise the Internet. The system 130 may comprise any number of IoT devices 132, any number of cell sites 134, any number of servers 138 and any number of data collection data stores 142.

In an embodiment, the IoT device 132 comprises a radio transceiver—either the optional radio transceiver incorporated in the IC 100 itself or a radio transceiver external to the IC 100 and communicatively coupled to the IC 100. In an embodiment, the radio transceiver is able to establish a radio communication link with the cell site 134 according to one of a long term evolution (LTE), a code division multiple access (CDMA), a global system for mobile communications (GSM), or another telecommunication protocol. These telecommunication protocols may comprise multimedia broadcast multicast service (MBMS), CDMA 1×RTT, universal mobile telecommunications system (UMTS), high-speed packet access (HSPA), evolution data optimized (EV-DO), EV-DO revision A, third generation partnership project long term evolution (3GPP LTE) and fourth generation broadband cellular (4G, LTE Advanced, etc.). In an embodiment, some of the IoT devices 132 may establish a radio communication link with the cell site 134 according to a 5G telecommunication protocol—for example 5G, 5G New Radio, or 5G LTE. In an embodiment, some of the IoT devices 132 may establish a radio communication link to the network 136 with another radio protocol, for example with WiFi (e.g., IEEE 802.11), narrowband IoT (NB IoT), Bluetooth, Zigbee, and/or another non-licensed spectrum radio protocol. In an embodiment, part of a communication link of some of the IoT devices 132 to the network 136 may be provided using industrial, scientific, and medical (ISM) radio band communication.

In an embodiment, some of the IoT devices 132 may be communicatively coupled to the network 136 via a wired communication link. These IoT devices 132 may communicate with the network 136 according to Ethernet (IEEE 802.3), Internet protocol (IP), time division multiplex (TDM), data over cable system interface specification (DOCSIS), wave division multiplexing (WDM), and/or the like. In an embodiment, some of the IoT devices 132 may be communicatively coupled to the network 136 via a power line communication (PLC) communication link. IoT devices 132 that are communicatively coupled to the network 136 via a wired communication link may not have a radio transceiver.

A wireless communication service provider that operates the cell site 134 or a mobile virtual network operator (MVNO) may provide a wireless communication service subscription account to the IoT devices 132. In some cases, the subscription plan associated with these accounts may be based on a volume of usage. Said in other words, the IoT devices 132 and/or the owners of the IoT devices 132 may be billed based on a volume of communication service usage. In some cases, the subscription plan associated with these accounts may be based, in part, on a quality of service (QoS) or a service level agreement (SLA) that is requested by the IoT device 132.

To promote billing per usage, per QoS, and/or per SLA, communication service usage may desirably be monitored, recorded, and analyzed to generate a bill periodically. Such billing of customary communication devices such as mobile phones already presents a significant processing burden on wireless communication service providers. In many cases, service providers hire a third party billing platform to conduct billing activities. But billing services provided by these third party billing platforms are expensive, costing in the hundreds of millions of dollars or even the billions of dollars per year for a mid-size wireless communication service provider. It is projected that the number of IoT devices 132 that will be deployed over the next decade will be an order of magnitude greater in number than the number of mobile phones deployed today. Employing the third party billing platforms of today to handle billing of communication service access for such large numbers of IoT devices 132 is not feasible, particularly when it is considered that the costs of IoT devices 132 must be kept to a minimum to promote their broad deployment. Another consideration is that the third party billing platforms are not easily or economically adaptable to new technologies, new interfaces, new message formats. The IoT devices 132 are expected to foment development of new technologies, rely upon new interfaces (for example new application programming interfaces (APIs)), and communicate using new message formats.

In an embodiment, the system 130 further comprises a sever 144 that executes a blockchain application 146 and a billing application 148. The system 130 further comprises a blockchain data store 150. The server 144 and the blockchain data store 150 may be owned and operated by a wireless communication service provider or a MVNO. It is understood that the system 130 may comprise any number of servers 144 and blockchain data stores 150.

Some of the ICs 100 embedded in the IoT devices 132 self-monitor their use of wireless communication services by detecting communication events, for example events defined and/or configured in the ICs 100 by executing the micro code provided during activation of the IC 100 and the IoT device 132. The blockchain application 120 in the IC 100 requests that an event block be created by the block foundry 116 that records information about the communication event, for example a time and date of the event, the identity of the event, and other pertinent data. Pertinent data may comprise an identity of the cell site 134 that is providing a wireless communication link to the IoT device 132, a wireless frequency band used by the IoT device 132 to communicate with the cell site 134, a data throughput rate used by the IoT device 132, a QoS requested by the IoT device 132, a SLA requested by the IoT device 132, and other information.

If the event block is the first event block, there may be no blockchain established for the IoT device 132 yet. The blockchain application 120 of the IC 100 sends a copy of the genesis block, the activation block, and the first event block to the blockchain application 146 executing on the server 144. The blockchain application 146 stores the copy of the activation block, the genesis block, and the first event block as the initial state of a blockchain associated with the IoT device 132.

Figure 3:
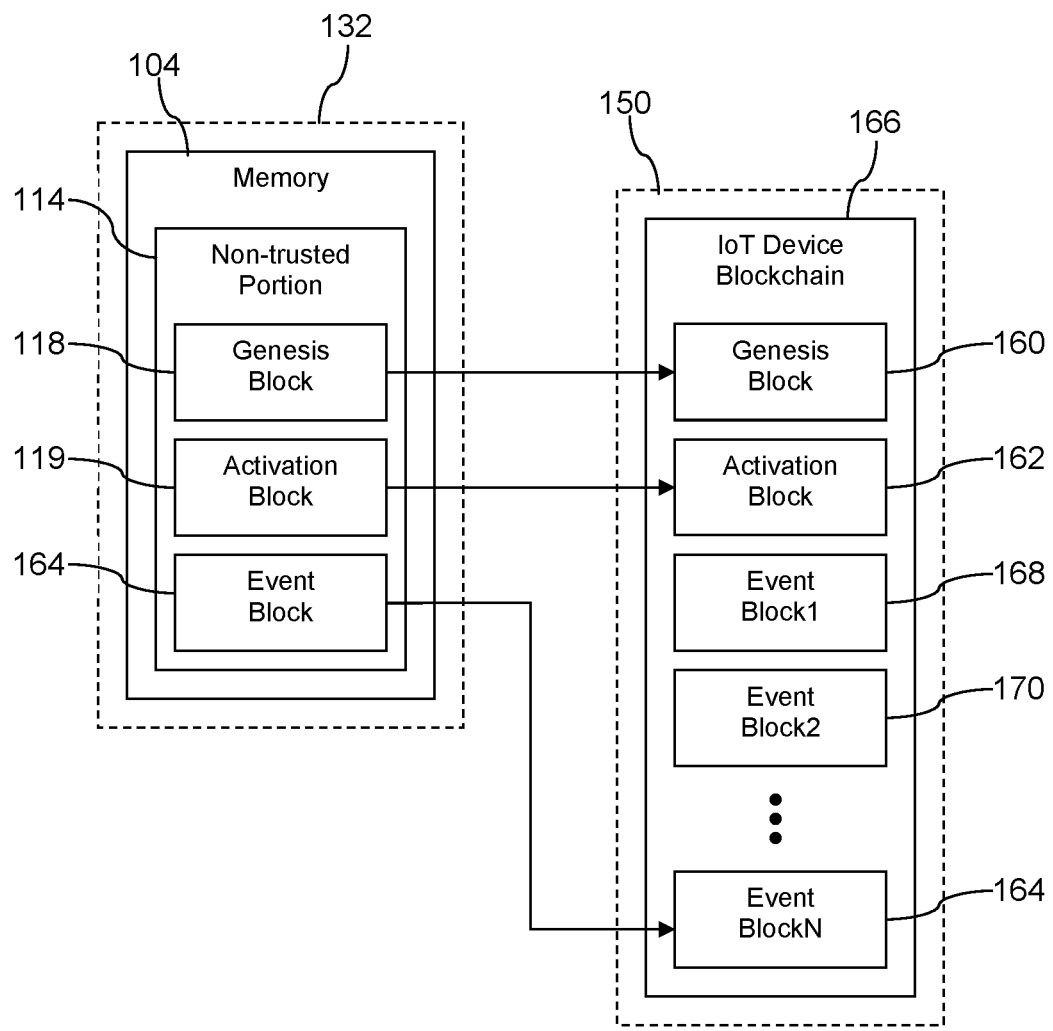
FIG. 3 is a block diagram of data structures according to an embodiment of the disclosure.

Turning now to FIG. 3, further details of a blockchain 166 associated with the IoT device 132 are described. The memory 104 stores the genesis block 118, the activation block 119, and the most recently created event block 164. In another embodiment, however, the memory 104 may store the entire blockchain associated with the IoT device 132, including all the event blocks created by the block foundry 116. The blockchain application 146 executed by the server 144 stores the blocks it receives from the IC 100 in the IoT device blockchain 166 as a copy genesis block 160, a copy activation block 162, a first event block 168, a second event block 170, and a most recently created event block 164. While the blockchain application 120 may delete previous event blocks stored in the memory 104 when a new event block is created (e.g., event block 164 is created), the blockchain data store 150 retains the complete IoT device blockchain 166. The blockchain application 120 may delete event blocks that precede the last event block as a strategy for conserving the limited memory resources of the memory 104.

In an embodiment, the billing application 148 executing on the server 144 periodically processes at least a part of the IoT device blockchain 166 to analyze communication service usage of the IoT device 132 since a previous billing cycle and to generate a communication service bill for the IoT device 132. The billing may be based on various factors including time and date of communication events, duration of a communication session, a throughput utilized by the IoT device 132, a service level agreement (SLA) established between the IoT device 132 and the network 136, and/or a quality of service (QoS) delivered to the IoT device 132. In an embodiment, the billing application 148 may process at least a portion of the IoT device blockchain 166 and generate a bill aperiodically, for example on the event of termination of wireless communication service to the IoT device 132 or transfer of ownership of the IoT device 132. In an embodiment, the billing application 148 may process at least a portion of the blockchain 166 and generate a bill when an estimated amount of communication service expense has been incurred by the IoT device 132, where the estimate may be based on the rate of communication service expense incurred by the IoT device 132 in the previous billing.

In an embodiment, the most recently created event block 164 comprises data aggregated from all preceding event blocks. In an embodiment, the most recently created event block comprises data aggregated from event blocks that have been created subsequent to the last previous service bill determination. In an embodiment, a billing application executes on the IC 100 to determine a bill for wireless communication service to the IoT device 132 in which the IC 100 is embedded. The billing application on the IC 100 may accrue billing based on instructions included in the micro code received during activation of the IoT device 132 and stored in the activation block 162. The billing application on the IC 100 may calculate an increment to the bill when each new event block is generated, increment the running total of the bill as calculated by the billing application on the IC 100, and store this updated running total bill in the memory 104. The billing application on the IC 100 may then transmit the running total bill when requested by the billing application 148 on the server 144, periodically, or on the event of the aggregated bill exceeding a predefined threshold. The predefined billing threshold may be provided in the micro code supplied during activation of the IoT device 132. After transmitting the bill and receiving confirmation that the bill has been received, for example by the wireless service provider and/or by the billing application 148 executing on the server 144, the billing application on the IC 100 may delete or zero-out the running bill stored in the memory 104. In an embodiment, the billing application on the IC 100 may be executed in the trusted security zone 108.

In the embodiment where the billing application on the IC 100 determines billing, the burden on the service provider of totaling up communication service bills for IoT devices 132 may be significantly reduced. This can be viewed as an improvement to the computational system overall, by reducing the processing burden on the server 144 and instead distributing this processing to the ICs 100. It may be assumed that the ICs 100 have surplus processing power that is not fully loaded. This solution can be viewed as a type of edge computing. The billing application 148 may randomly perform its own calculation of a service bill for selected IoT devices 132 and compare its calculation to those determined by the IoT devices 132, whereby to detect any fraud or other failure of the billing calculation by ICs 100. For example, every billing interval the billing application 148 may calculate the bills of 1% of all the IoT devices 132 and compare this calculated bill to the self-calculated bill transmitted by the IC 100. In different billing intervals, different 1% selections of the IoT devices 132 may be used to calculate the bill on the billing application 148.

Figure 4:
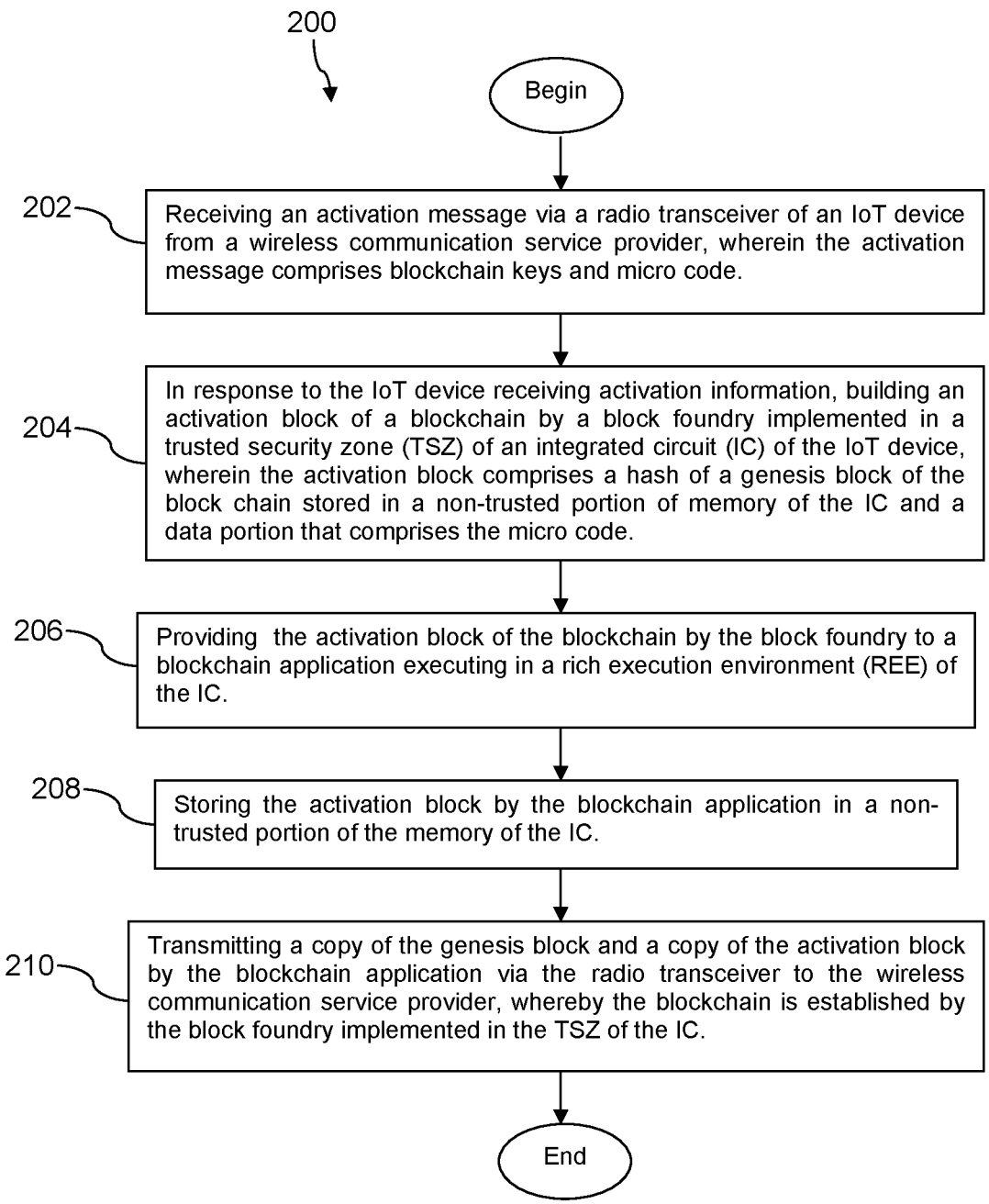
FIG. 4 is a flow chart of a method according to an embodiment of the disclosure.

Turning now to FIG. 4, a method 200 is described. In an embodiment, the method 200 is a method of establishing a blockchain associated with an Internet of things (IoT) device by a block foundry implemented in a trusted security zone of an integrated circuit of the IoT device. At block 202, the method 200 comprises receiving an activation message via a radio transceiver of an IoT device from a wireless communication service provider, wherein the activation message comprises wireless communication authentication keys and micro code. The activation message may be transmitted to the IoT device during a system assembly process where the IoT device is embedded in the system. For example, during the assembly of a refrigerator, prior to delivering the refrigerator to a retail store, the activation message may be sent to the IoT device to configure the IoT device to connect to a wireless communication network. For example, when a consumer installs a system in his or her home, the consumer may perform an activation process for the system, and the activation message may be sent to the IoT device to configure the IoT device to connect to the wireless communication network.

The activation message may further comprise a schedule of communication billing rates, constraints on quality of service (QoS) that the IoT device may request from the service provider, a range of service level agreements (SLAs) the IoT device may request from the service provider, a wireless frequency band or a plurality of wireless frequency bands that the IoT device is permitted by the wireless service provider to use. This information may be contained as data within the activation message or it may be embedded in the micro code, such that when the micro code is executed by the IoT device and/or the IC, the subject billing rates and constraints are configured into the IC. The micro code may comprise instructions that the IC may execute to generate a service bill for its use or the IoT device's use of wireless communication services.

At block 204, the method 200 comprises, in response to the IoT device receiving activation information, building an activation block of a blockchain by a block foundry implemented in a trusted security zone (TSZ) of an integrated circuit (IC) of the IoT device, wherein the activation block comprises a hash of a genesis block of the block chain stored in a trusted portion of memory of the IC and a data portion that comprises the micro code. The data portion may further comprise data such as authentication credentials and constraints of wireless communication activities of the IC and/or the IoT device.

At block 206, the method 200 comprises providing the activation block of the blockchain by the block foundry to a blockchain application executing in a rich execution environment (REE) of the IC. At block 208, the method 200 comprises storing the activation block by the blockchain application in a non-trusted portion of the memory of the IC.

At block 210, the method 200 comprises transmitting a copy of the genesis block and a copy of the activation block by the blockchain application via the radio transceiver to the wireless communication service provider, whereby the blockchain is established by the block foundry implemented in the TSZ of the IC. In an embodiment, the processing of block 210 is not performed until after a first event block is generated by the block foundry, and in this case the method 200 transmits the copies of the genesis block and the activation block along with the first event block to the wireless communication service provider, and this establishes the blockchain for the service provider.

In an embodiment, the micro code comprises billing instructions that may be executed by IC in the TEE. The billing instructions may total up a bill for wireless communication services consumed by the IC and/or the IoT device and store this bill in the trusted portion of the memory of the IC. This billing may be performed incrementally as the event blocks are created. The bill accrued may be transmitted to the wireless communication service provider periodically or when the bill has accrued to a predefined total amount, based on the micro code. After transmitting the accrued bill, the accrued bill may be reset to a zero amount in the trusted portion of memory of the IC.

Figure 5A:
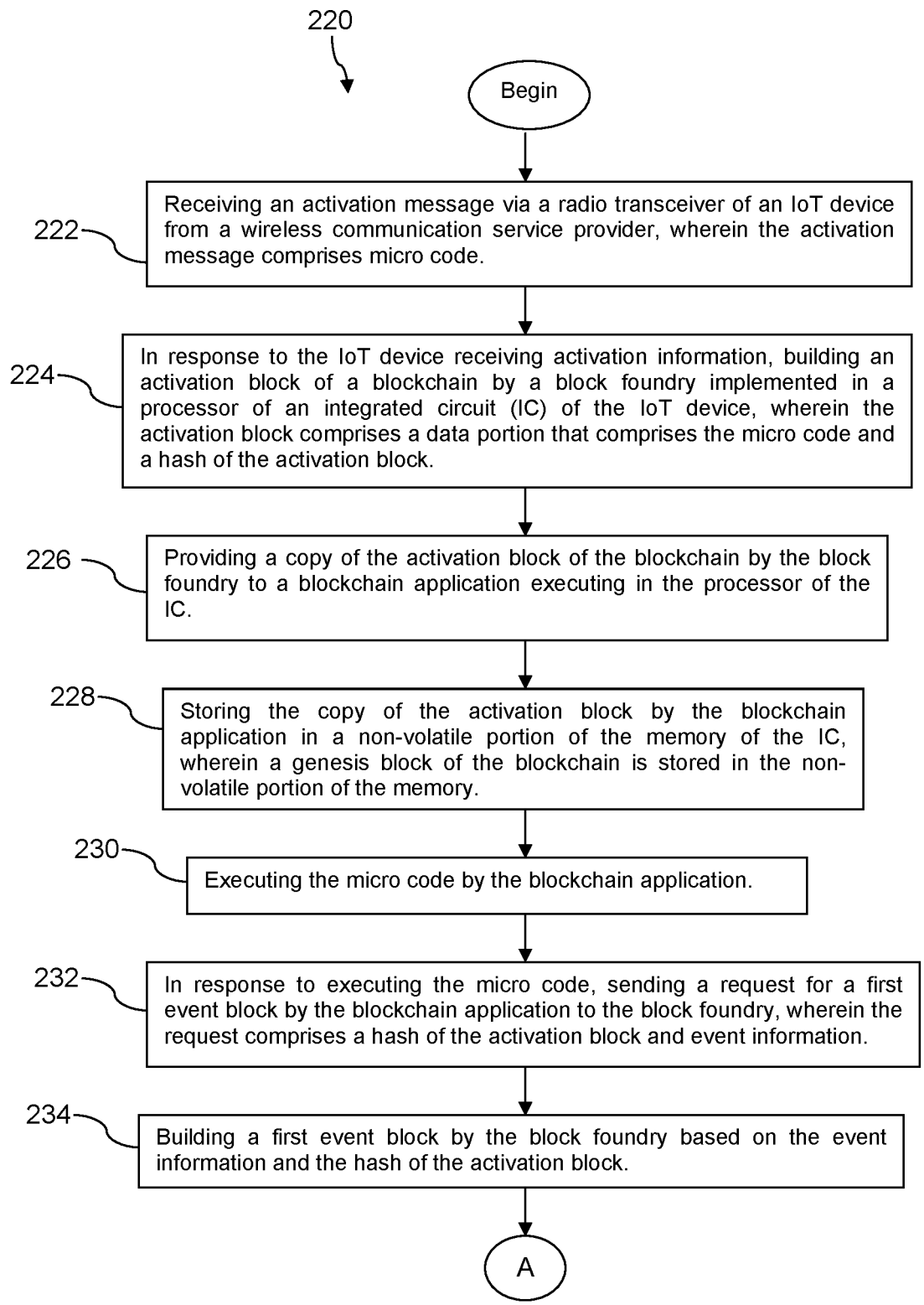
FIG. 5A and FIG. 5B are a flow chart of another method according to an embodiment of the disclosure.
Figure 5B:
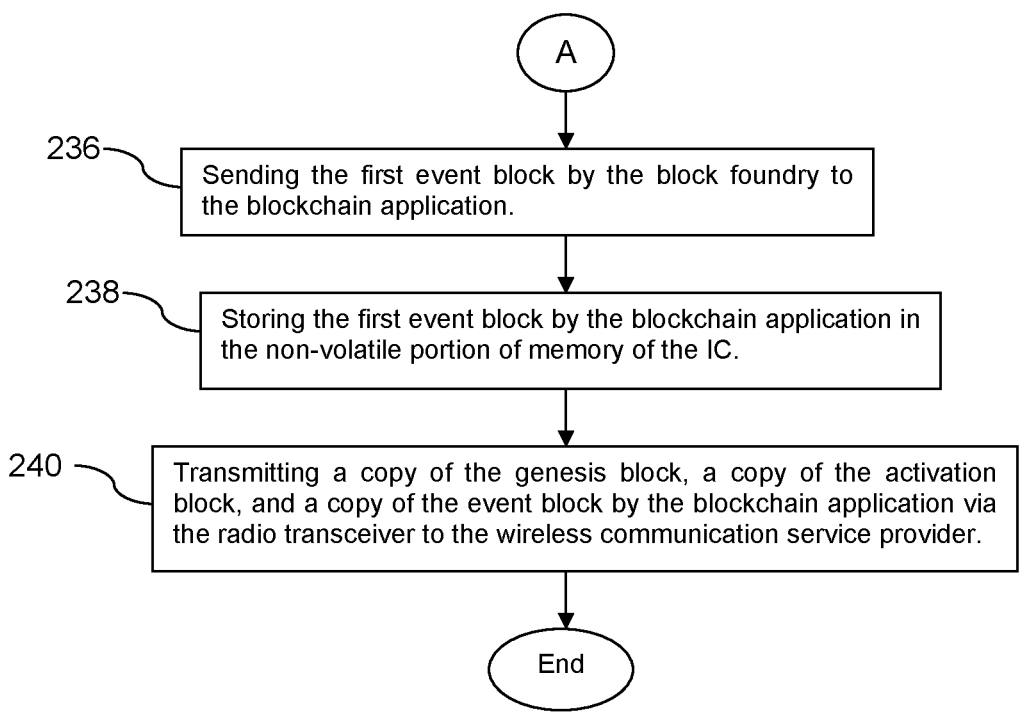

Turning now to FIG. 5A and FIG. 5B, a method 220 is described. In an embodiment, the method 220 is a method of establishing and extending a blockchain associated with an Internet of things (IoT) device by a block foundry implemented in a processor of an integrated circuit of the IoT device. At block 222, the method 220 comprises receiving an activation message via a radio transceiver of an IoT device from a wireless communication service provider, wherein the activation message comprises micro code.

At block 224, the method 220 comprises, in response to the IoT device receiving activation information, building an activation block of a blockchain by a block foundry implemented in a processor of an integrated circuit (IC) of the IoT device, wherein the activation block comprises a data portion that comprises the micro code and a hash of the activation block. At block 226, the method 220 comprises providing the activation block of the blockchain by the block foundry to a blockchain application executing in the processor of the IC.

At block 228, the method 200 comprises storing the activation block by the blockchain application in a non-volatile portion of a memory of the IC, wherein a genesis block of the blockchain is stored in the non-volatile portion of the memory. At block 230, the method 220 comprises executing the micro code by the blockchain application. At block 232, the method 220 comprises, in response to executing the micro code, sending a request for a first event block by the blockchain application to the block foundry, wherein the request comprises a hash of the activation block and event information.

At block 234, the method 220 comprises building a first event block by the block foundry based on the event information and the hash of the activation block. At block 236, the method 220 comprises sending the first event block by the block foundry to the blockchain application.

At block 238, the method 220 comprises storing the first event block by the blockchain application in the non-volatile portion of the memory of the IC. At block 240, the method 220 comprises transmitting a copy of the genesis block, a copy of the activation block, and a copy of the event block by the blockchain application via the radio transceiver to the wireless communication service provider, whereby the blockchain is established by the block foundry implemented in the TSZ of the IC.

Figure 6:
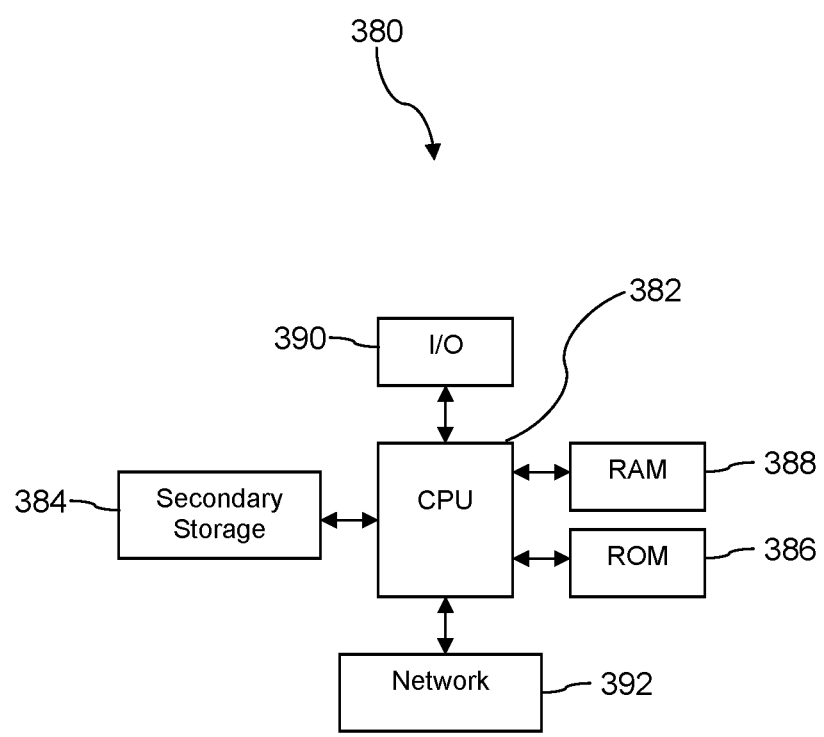
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable system interface specification (DOCSIS), wave division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of establishing and extending a blockchain associated with an Internet of things (IoT) device by a block foundry implemented in a processor of an integrated circuit of the IoT device, comprising:
    building an activation block of a blockchain by a block foundry implemented in a processor of an integrated circuit (IC) of the IoT device, wherein the activation block comprises micro code;
    providing a copy of the activation block of the blockchain by the block foundry to a blockchain application executing in the processor of the IC;
    executing the micro code by the blockchain application;
    in response to executing the micro code, sending a request for an event block by the blockchain application to the block foundry, wherein the request comprises event information;
    building an event block by the block foundry based on the event information;
    sending the event block by the block foundry to the blockchain application;
    storing the event block by the blockchain application in the non-volatile portion of memory of the IC; and
    transmitting a copy of the event block by the blockchain application via a radio transceiver to a wireless communication service provider.

2. The method of claim 1, wherein the micro code further defines generation of a bill, and further comprising:
    in response to executing the micro code, generating the bill based on the event block by a billing application executing on the IC; and
    transmitting the bill by the billing application via the radio transceiver to the wireless communication service provider.

3. The method of claim 1, wherein the micro code further defines a toll that will later aggregate to a bill, and further comprising:

in response to executing the micro code, determining, by a billing application executing on the IC, an increment to a running total of the bill based on the event block; and transmitting the running total of the bill by the billing application via the radio transceiver to the wireless communication service provider.

4. The method of claim 1, further comprising receiving an activation message via the radio transceiver of the IoT device from the wireless communication service provider, wherein the activation message comprises the micro code and wireless communication service authentication credentials, and wherein the radio transceiver establishes a wireless communication link with the wireless communication service provider based in part by transmitting the wireless communication service authentication credentials.

5. The method of claim 1, further comprising receiving an activation message via the radio transceiver of the IoT device from the wireless communication service provider, wherein the activation message comprises the micro code, and wherein executing the micro code by the blockchain application comprises configuring the IC to conduct radio communications in accordance with a quality of service (QOS) defined in the activation message.

6. The method of claim 1, further comprising receiving an activation message via the radio transceiver of the IoT device from the wireless communication service provider, wherein the activation message comprises the micro code, and wherein executing the micro code by the blockchain application comprises configuring the IC to conduct radio communications in accordance with a service level agreement (SLA) defined in the activation message.

7. The method of claim 1, further comprising receiving an activation message via the radio transceiver of the IoT device from the wireless communication service provider, wherein the activation message comprises the micro code, and wherein executing the micro code by the blockchain application comprises configuring the IC to conduct radio communications in a wireless frequency band defined in the activation message.

8. An integrated circuit (IC), comprising:
a non-transitory memory;
a processor;
a block foundry built in the processor, wherein the block foundry is configured to generate blocks of a blockchain; and
a blockchain application built in the processor that, when the processor executes,
sends a one-time request to the block foundry to build an activation block of the blockchain, wherein the request to build the activation block comprises micro code that is input to the IC during a process of activating the IC for use in an appliance in which the IC is embedded,
in response to the one-time request, receives the activation block from the block foundry, wherein the activation block comprises the micro code,
executes the micro code,
based on executing the micro code, sends a request to the block foundry to build an event block, wherein the request to build the event block comprises event information,
receives the event block from the block foundry,
stores the event block in the non-transitory memory, and
transmits a copy of the event block to a server computer.

9. The IC of claim 8, wherein the block foundry is built in a trusted security zone (TSZ) of the processor and the TSZ is one of a trust zone, a secure enclave, a cryptocell, an SGX, a crypto element, or a hardware root of trust (HROT).

10. The IC of claim 8, further comprising a radio transceiver, wherein the blockchain application transmits to the server computer via the radio transceiver, and wherein the radio transceiver establishes radio communication with a wireless communication network according to a 5G, a long term evolution (LTE), a code division multiple access (CDMA), a global system for mobile communications (GSM), a WiFi, a narrow band Internet of things (NB IoT), a Bluetooth, or a Zigbee wireless communication protocol.

11. The IC of claim 10, wherein the micro code comprises wireless communication service authentication credentials that are used to establish radio communication with the wireless communication network.

12. The IC of claim 10, wherein the request to build the activation block further comprises wireless communication service authentication credentials that are input to the IC during the process of activating the IC, and wherein the wireless communication service authentication credentials are used to establish radio communication with the wireless communication network.

13. The IC of claim 12, wherein the request to build the activation block further comprises constraints on the radio communication operation of the radio transceiver.

14. The IC of claim 13, wherein the constraints are associated with at least one of a quality of service (QOS) granted to the IC, a service level agreement (SLA) granted to the IC, and a wireless frequency band used by the IC for radio communication.

15. A method of establishing and extending a blockchain associated with an Internet of things (IoT) device by a block foundry implemented in a processor of an integrated circuit of the IoT device, comprising:
building an activation block of a blockchain by a block foundry implemented in a processor of an integrated circuit (IC) of the IoT device, wherein the activation block comprises micro code;
providing a copy of the activation block of the blockchain by the block foundry to a blockchain application executing in the processor of the IC;
executing the micro code by the blockchain application;
in response to executing the micro code, sending a request for an event block by the blockchain application to the block foundry, wherein the request comprises sensor data;
building an event block by the block foundry based on the sensor data;
sending the event block by the block foundry to the blockchain application;
storing the event block by the blockchain application in the non-volatile portion of memory of the IC; and
transmitting a copy of the event block by the blockchain application via a radio transceiver to a wireless communication service provider.

16. The method of claim 15, further comprising encrypting the event block prior to transmitting the copy of the event block, wherein the copy of the event block is encrypted.

17. The method of claim 15, wherein the block foundry is built in a trusted security zone (TSZ) of the processor and the TSZ is one of a trust zone, a secure enclave, a cryptocell, an SGX, a crypto element, or a hardware root of trust (HROT).

18. The method of claim 15, wherein the radio transceiver establishes radio communication with the wireless communication service provider according to a 5G, a long term evolution (LTE), a code division multiple access (CDMA), a global system for mobile communications (GSM), a WiFi, a narrow band Internet of things (NB IoT), a Bluetooth, or a Zigbee wireless communication protocol.

19. The method of claim 15, further comprising receiving an activation message via the radio transceiver of the IoT device from the wireless communication service provider, wherein the activation message comprises the micro code and constraints on the radio communication operation of the radio transceiver.

20. The method of claim 19, wherein the constraints are associated with at least one of a quality of service (QOS) granted to the IC, a service level agreement (SLA) granted to the IC, and a wireless frequency band used by the IC for radio communication.

\* \* \* \* \*